(12) United States Patent
Menkveld

(10) Patent No.: US 10,119,320 B2
(45) Date of Patent: *Nov. 6, 2018

(54) CONTROL SYSTEM FOR PROVIDING CLOUD BASED COMMANDS FOR CONTROLLING OPERATION OF A MOVEABLE BARRIER

(71) Applicant: Menklab, LLC, Belmont, MI (US)

(72) Inventor: Justin Menkveld, Grand Rapids, MI (US)

(73) Assignee: Menklab, LLC, Belmont, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,099

(22) Filed: May 2, 2017

(65) Prior Publication Data
US 2017/0241183 A1 Aug. 24, 2017

Related U.S. Application Data

(63) Continuation-in-part of application No. 14/555,570, filed on Nov. 26, 2014, now Pat. No. 9,672,670.

(51) Int. Cl.
| | |
|---|---|
| *G07C 9/00* | (2006.01) |
| *E05F 15/73* | (2015.01) |
| *H04L 29/08* | (2006.01) |
| *E05F 15/79* | (2015.01) |
| *H04W 4/02* | (2018.01) |
| *E05F 15/668* | (2015.01) |
| *E05F 15/77* | (2015.01) |

(52) U.S. Cl.
CPC ............ *E05F 15/73* (2015.01); *E05F 15/668* (2015.01); *E05F 15/77* (2015.01); *E05F 15/79* (2015.01); *G07C 9/00126* (2013.01); *G07C 9/00571* (2013.01); *H04L 67/025* (2013.01); *H04L 67/10* (2013.01); *H04W 4/023* (2013.01); *E05F 2015/763* (2015.01); *E05Y 2900/106* (2013.01); *G07C 2009/00769* (2013.01); *G07C 2009/00928* (2013.01); *G07C 2209/62* (2013.01)

(58) Field of Classification Search
CPC .............................................. G07C 2009/00928
USPC .................................................. 340/5.7, 5.71
See application file for complete search history.

(56) References Cited

U.S. PATENT DOCUMENTS

| | | |
|---|---|---|
| 6,161,005 A | 12/2000 | Pinzon |
| 6,295,448 B1 | 9/2001 | Hayes et al. |
| 6,308,083 B2 | 10/2001 | King |
| 6,400,956 B1 | 6/2002 | Richton |
| 6,462,660 B1 | 10/2002 | Cannon et al. |
| 6,490,443 B1 | 12/2002 | Freeny |

(Continued)

*Primary Examiner* — Kevin Kim
(74) *Attorney, Agent, or Firm* — Frank M. Scutch, III

(57) ABSTRACT

A control system for providing Cloud based commands to a garage door includes one or more Cloud servers for receiving commands from at least one mobile web enabled user device. A load balancer is used for receiving communication from a server for distributing commands from at least one web enabled device to the Cloud. A server based garage door opener is used for receiving commands and controlling operation of a garage door from the server. The status of the garage door is determined by measuring a distance of the garage door to the garage floor using a distance measuring device such that distance measuring information is communicated to the server for determining the open or closed status of the garage door before movement.

15 Claims, 6 Drawing Sheets

(56) References Cited

U.S. PATENT DOCUMENTS

| | | |
|---|---|---|
| 6,542,076 B1 | 4/2003 | Joao |
| 6,542,077 B2 | 4/2003 | Joao |
| 6,549,130 B1 | 4/2003 | Joao |
| 6,927,684 B2 | 8/2005 | Joyner |
| 7,113,090 B1 | 9/2006 | Saylor et al. |
| 7,197,278 B2 | 3/2007 | Harwood et al. |
| 7,209,729 B2 | 4/2007 | Oyagi et al. |
| 7,266,344 B2 | 9/2007 | Rodriguez |
| 7,397,363 B2 | 7/2008 | Joao |
| 7,403,838 B2 | 7/2008 | Deen et al. |
| 7,468,676 B2 | 12/2008 | Styers et al. |
| 7,493,651 B2 | 2/2009 | Vanska et al. |
| 7,498,936 B2 | 3/2009 | Maeng |
| 7,515,063 B2 | 4/2009 | Brundula |
| 7,532,709 B2 | 5/2009 | Styers |
| 7,602,283 B2 | 10/2009 | John |
| 7,663,502 B2 | 2/2010 | Breed |
| 7,697,674 B2 | 4/2010 | Nassimi |
| 7,804,425 B2 | 9/2010 | Kwiecinski et al. |
| 7,809,374 B2 | 10/2010 | Feher |
| 7,869,582 B2 | 1/2011 | Styer et al. |
| 7,881,733 B2 | 2/2011 | Staton et al. |
| 7,917,153 B2 | 3/2011 | Orwant et al. |
| 7,929,950 B1 | 4/2011 | Rao et al. |
| 8,026,946 B2 | 9/2011 | Nassimi |
| 8,040,217 B2 | 10/2011 | Fitzgibbon |
| 8,090,356 B2 | 1/2012 | Rao et al. |
| 8,112,110 B2 | 2/2012 | Ferher |
| 8,115,609 B2 | 2/2012 | Ketari |
| 8,127,984 B2 | 3/2012 | Zatloukal et al. |
| 8,175,591 B2 | 5/2012 | Fitzgibbon |
| 8,190,193 B2 | 5/2012 | Feher |
| 8,218,739 B2 | 7/2012 | Styers et al. |
| 8,290,515 B2 | 10/2012 | Staton et al. |
| 8,331,544 B2 | 12/2012 | Kraus |
| 8,345,846 B2 | 1/2013 | Nassimi |
| 8,421,591 B2 | 4/2013 | Karasek |
| 8,442,501 B1 | 5/2013 | Rao et al. |
| 8,447,289 B2 | 5/2013 | Rao et al. |
| 8,472,927 B1 | 6/2013 | Rao et al. |
| 8,472,936 B1 | 6/2013 | Rao et al. |
| 8,472,937 B1 | 6/2013 | Rao et al. |
| 8,477,019 B2 | 7/2013 | Laroia et al. |
| 8,509,954 B2 | 8/2013 | Imes et al. |
| 2002/0188575 A1 | 12/2002 | Freeny |
| 2006/0046794 A1 | 3/2006 | Scherschel et al. |
| 2007/0055776 A1 | 3/2007 | Hom et al. |
| 2007/0118426 A1 | 5/2007 | Barnes |
| 2007/0248219 A1 | 10/2007 | Foster et al. |
| 2009/0156126 A1 | 6/2009 | Willis |
| 2009/0160637 A1 | 6/2009 | Maeng |
| 2009/0163140 A1 | 6/2009 | Packham et al. |
| 2010/0071053 A1 | 3/2010 | Ansari et al. |
| 2010/0151825 A1 | 6/2010 | Millet |
| 2010/0171588 A1* | 7/2010 | Chutorash .......... G07C 9/00182 340/5.71 |
| 2010/0201482 A1 | 8/2010 | Robertson et al. |
| 2010/0201536 A1 | 8/2010 | Robertson et al. |
| 2010/0242369 A1 | 9/2010 | Laird |
| 2011/0086668 A1 | 4/2011 | Patel |
| 2011/0311052 A1 | 12/2011 | Myers et al. |
| 2012/0026836 A1* | 2/2012 | Scripca ................. G01S 15/18 367/99 |
| 2012/0079119 A1 | 3/2012 | Gill et al. |
| 2013/0109404 A1 | 5/2013 | Husney |
| 2013/0147600 A1 | 6/2013 | Murray |
| 2013/0151977 A1 | 6/2013 | Arteaga-King et al. |
| 2013/0207777 A1 | 8/2013 | Zatloukal et al. |
| 2015/0235172 A1* | 8/2015 | Hall ................... G06Q 10/0833 705/333 |

* cited by examiner

CONTROL SYSTEM FOR PROVIDING CLOUD BASED COMMANDS FOR CONTROLLING OPERATION OF A MOVEABLE BARRIER

FIELD OF THE INVENTION

The present invention relates generally to moveable barriers such as garage doors and more particularly to a control system for operating the opening and closing a garage door using the Internet.

BACKGROUND

Control systems for controlling home appliances via the Internet are well known in the art. For example, Nest Labs is a home automation company that designs and manufactures sensor-driven, Wi-Fi-enabled, self-learning, programmable thermostats and smoke detectors. Nest is compatible with most standard HVAC systems that use central heating and cooling and uses industry standard connections to facilitate the control of these appliances. The Nest control system consists of two primary pieces of hardware viz. a display that contains the main printed circuit board (PCB) and rotating ring; and the base that houses the connection terminals.

The Nest thermostat is built around an operating system that allows interaction with the thermostat via spinning and clicking of its control wheel. This control is used for accessing option menus for switching from heating to cooling, access to device settings, energy history, and scheduling. Users can control Nest without a touch screen or other input device. As the thermostat is connected to the Internet, updates can be pushed to fix bugs, improve performance and add additional features. Thus, the thermostat can be controlled from and receive updates through its Internet connection.

Still other inventions are more specific to the opening and closing of garage doors. U.S. Pat. No. 6,998,977 which is herein incorporated by reference in its entirety, teaches an apparatus for controlling a movable barrier operator such as a garage door. A network interface is electronically connected to the garage door for connecting the garage door to a network. In use, the garage door communicates directly over a user's local network by exchanging status request messages. A problem with this architecture is that users must go through a complicated setup process to allow for any outside communication. Moreover, average persons often do not have the time or technical ability to accomplish a complex set-up process. This type of network typically requires additional paid services to guarantee uninterrupted access to control the door. These services might include paying for ISP (Internet Service Provider) for a static IP Address or alternatively subscribing to a dynamic DNS service such as provided by Dyn Inc. (www.dyndns.com).

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
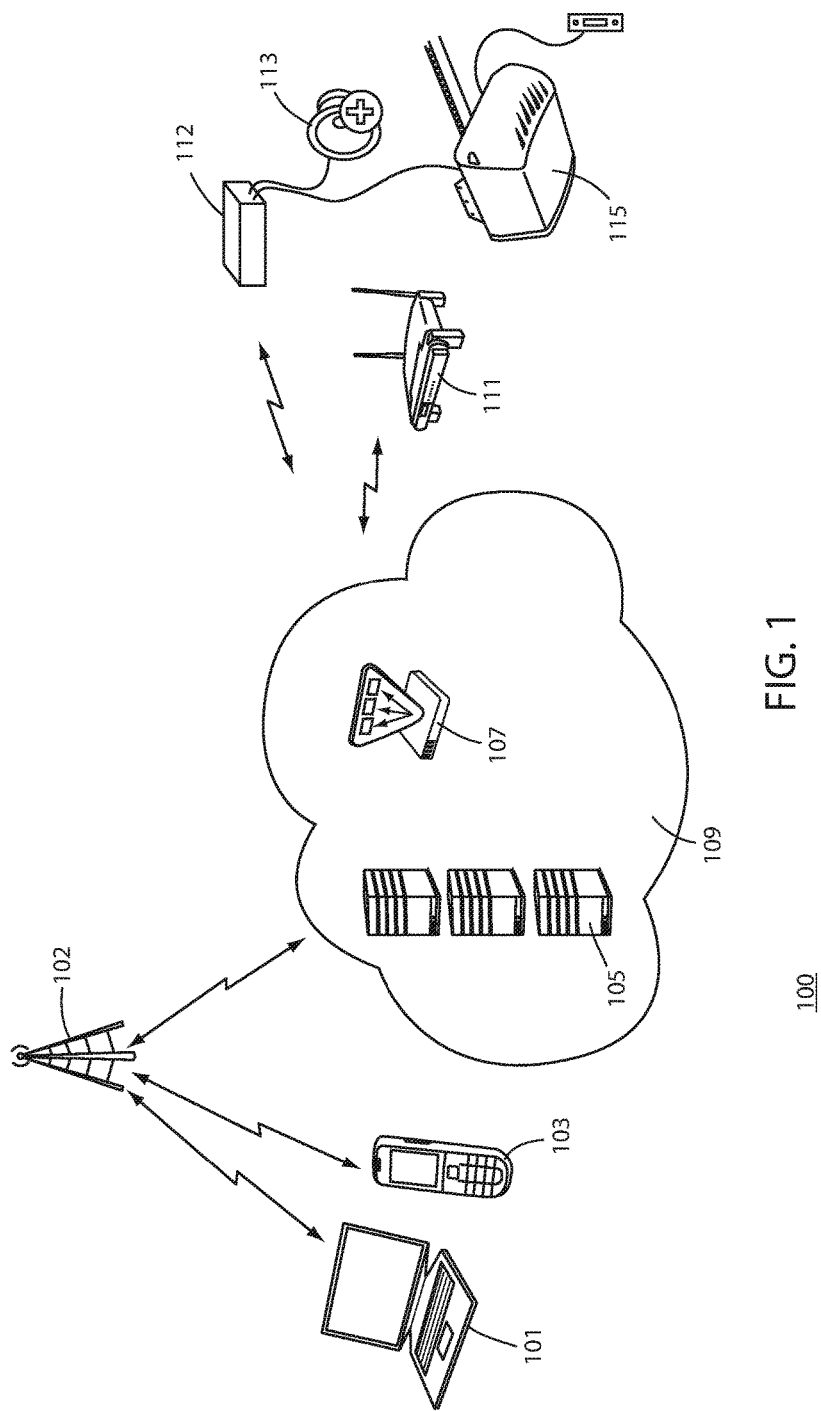
FIG. 1 is a diagram illustrating an Internet enabled user device communicating in the Cloud through a load balancer, access/business logic server, which communicates over the Internet to a wireless router installed at the home/business which then communicates to the wireless enabled command device that simulates a garage door opener button/switch.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a control system for providing Cloud based commands for controlling operation of a moveable barrier such as a garage door. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control one or more processors to implement, in conjunction with certain non-processor circuits, some, most, or all of the functions of a control system for providing Cloud based commands to control a garage door or other moveable barrier as described herein. The non-processor circuits may include, but are not limited to, a radio receiver, a radio transmitter, signal drivers, clock circuits, power source circuits, and user input devices. As such, these functions may be interpreted as steps of a method to perform the control of a garage door using Cloud based commands. Alternatively, some or all functions could be implemented by a state machine that has no stored program instructions, or in one or more application specific integrated circuits (ASICs), in which each function or some combinations of certain functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a diagram illustrating a communications arrangement used in an embodiment of the invention where an Internet enabled user device communicates to a load balancer in the Cloud. The load balancer then communicates to business logic/access servers in the cloud which in turn communicate to a router on the premises of the user/business to a command device to a garage door controller. The "command device" resides within a user's area of operation and/or control. More specifically, it is the device the directly interfaces with the movable barrier control/drive unit. The command device also directly interfaces with a Sonar (Sound Navigation and Ranging) unit that uses echolocation to take distance readings of the movable barrier. The command device authenticates any request it receives from the associated Cloud services to verify it is securely communicating with the correct services to prevent "man in the middle" (MITM) attacks. The command device is considered a pass-through controller, that is to say it has no information concerning the actual movable barrier and simply responds to commands it receives from the Cloud services. Such commands include but are not limited to toggling a relay or requesting distance readings from the Sonar unit. The command device normally but is not limited to communicating to the Cloud services via a wireless connection that is available in the area of operation. Thus, an important aspect of the present invention is that the moveable barrier control system operates though Cloud based servers and might also be referred to as a server-based door opener (SBDO).

According to an embodiment of the invention, the moveable barrier communication system 100 includes an Internet-enabled mobile communications device such as a laptop computer 101, mobile phone 103 or any type of Internet capable tablet device. The portable device 101 communicates with a networked communications device 102 such as a mobile phone cell site, Wi-Fi hub, or wired network connection such as a local area network (LAN). The network communications device 102 in-turn communicates with a load balancer 107. The load balancer 107 then communicates with one or more servers 105. As noted herein, a load balancer 107 works to distribute the communications load across a communications network. The load balancer 107 communicates to a server 105 which transmits data via the Cloud/Internet 109. This data is then communicated to a personal Wi-Fi and/or wired network 111 at the user's home.

The Wi-Fi network 111 wirelessly communicates with the command device 112 although wired control is also an option. The command device 112 communicates with both the connected Sonar device 113 as well as with a moveable barrier operator such as a user's garage door controller 115. As described herein, the command device 112 works with a garage door controller 115 that may or may not actuate movement of the garage door using its own independent wireless garage door opener.

Thus, an important aspect of the present invention is the manner upon which the user can control movement of the garage door. This occurs when the command device 112 communicates with Cloud servers via the user's personal in-home WiFi connection to operate a garage door controller 115. Those skilled in the art will recognize a Cloud server or Cloud server Services is any server or set of services that have a public facing interface. Most but not all, Cloud services, reside completely offsite from their clients Command device and Portable devices. Cloud services provide all of the business logic, authentication, and communication mediums for the given invention. Hence, Cloud services are what determine the status of a movable barrier and provide users a means to interact and control the movable barrier. Cloud services also allow shared access to other users, provides alerts, and any other function useful to users or administrators. These services include but are not limited to load balancers, databases, communication servers, emailing and messaging servers, web servers, authentication servers and more.

Communication with Cloud servers may be from an embedded device or a separate device attached to the user's wireless garage door opener; otherwise known as the command device 112. Thus, another aspect of the invention is that the command device 112 can integrate with any garage door opener. Thus, according to another embodiment of the invention, the user never communicates directly with the garage door controller 115 but instead communicates through one or more Cloud-based servers 105. This allows better control of the garage door or other barrier. This is advantageous since all door communications can be set-up to circumvent home routing including firewalls, static IP/DHCP addressing and port forwarding, while being completely secure using dull duplex transmission over a TCP connection. Communication will likely occur over HTTPS in order to encrypt and decrypt user traffic/requests to the command device for controlling the moveable barrier or garage door.

Another aspect of the present invention is how the garage door is configured to communicate with a home wireless router using WPA/WPA2 encryption. In use, the command device 112 communicates through a wireless router to the Cloud where the load balancer 107 resides. Those skilled in the art will recognize that the load balancer 107 is a device that distributes communication between one or more servers 105. The servers act as reverse proxy that allows for full duplex (simultaneous, two-way) communication between the communications devices 101, 103 and the garage door command device 112 which in-turn operates the garage door opener 115. Thus, the load balancer is used to increase capacity of concurrent users as well as to increase the reliability of the mobile device application or app operating on the portable device 101, 103.

In use, a user connects to a server 105 though a portable device that is Internet enabled such as a laptop 101, smart phone 103 or tablet running an mobile application including but not limited to that of a cloud hosted web application (webapp). The user never communicates directly with the garage door 115 or command device 112 but instead communicates to one or more servers that will interpret both user authentication and user rights. Business logic in the server 105 operates to transmit alerts, push notifications and scheduling notices etc. by sending commands to the garage door command device 112 associated with a specific garage door opener 115. The user connects using the mobile application (or alternatively via a webapp/website) through the load balancer 107 to one or more servers 105 for controlling operating of the garage door. As will be described herein, when the user requests to "open" the garage door, a number of sequential steps must occur for the open command to succeed. In accordance with the invention, a user of the garage door has no way of "directly" controlling or accessing either the command device 112 or the door controller 115. Instead, they must communicate through the Cloud based server 105.

Furthermore, the command device may act as a pass-through to allow Cloud services to operate other peripherals that relate directly to the movable barrier. An example of such peripherals may include but are not limited to: interior/exterior garage lights and security cameras within the area of operation. Additionally, the Cloud services may also operate the movable barrier in an automatic fashion based upon previously defined business logic. For example, such logic may include but is not limited to a) closing the movable barrier after it has been open a defined amount of time; and/or b) attempting to close the movable barrier a second time after a failed initial attempt. Notifications could include but are not limited to notifying the user that the barrier failed to close or that unauthorized access was gained via another method other than the Cloud services. An example might be actuation of a home security alarm or manually opening the barrier.

Figure 2:
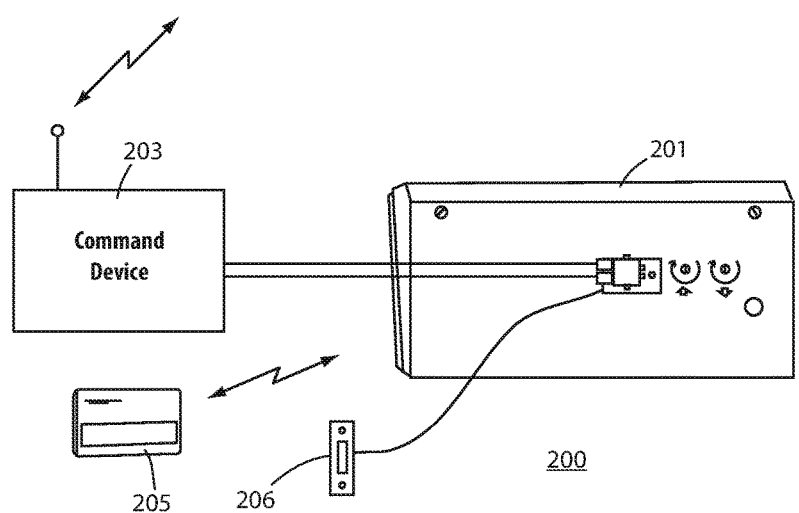
FIG. 2 is a diagram illustrating how command device simulates a button press by connecting to the same terminal on the garage door controller as that of a physical wired garage door button control. This can also be accomplished with an embedded device directly on the overhead opener printed circuit board (PCB).

As seen in FIG. 2, a garage door controlling system 200 includes a device for controlling the garage door position such as an opener 201. A wireless receiver 205 typically operates the opener 201 however according to a further aspect of the invention an opener 201 can also be controlled by the user through a server which sends commands to a separate command device 203. In this way, the command device 203 is typically connected to the same wired terminals of the opener 201 as would the wired garage door button controller 206.

Hence, FIG. 2 illustrates how a garage door controller simulates a "button press" by connecting to the same electrical terminal on the garage door controller as that of a physical wired garage door button controller 206. In order to open the garage door, the user requests the garage door to be opened/closed on a mobile enabled device typically by actuating a touch screen button that is displayed in software on the mobile device. This request is sent into the Cloud where it is interpreted by a load balancer. The load balancer sends the request to the "least used" server. The server then executes business logic software algorithms to determine if the garage door should be opened/closed and proceeds accordingly. Those skilled in the art will further recognize that business logic may include, but is not limited to, a server that determines if the user is authorized to access the moveable barrier or door. In order to determine if movement is necessary, the server requests a "distance" measurement from the garage door device in order to determine the status of the door (see below "request distance"). If the garage door needs to be moved, the server sends a request to the command device 203 to simulate a physical button press. Thereafter, an acknowledgment is sent from the command device 203 to the server and relayed by the server in reply to the user through the Internet/Cloud to confirm action and new garage door position status.

If the user makes the appropriate request, the server will provide a position status of the garage door. This status indicates whether the garage door is either in 1) a full or partially opened position; or 2) in a fully closed position. When a request is made for the command device provides a measured status reprot, the distance from the Sonar device to the open door or from the Sonar device to the garage floor is made using a Sonar or like device to determine distance. This enables a position status to be computed in the Cloud based upon "known" distance variables and algorithms set in memory upon installation.

To determine position status, the server initially sends a request to the command device. The command device will request the Sonar unit take a distance reading. The Sonar unit makes the distance reading or determination and communicates the measurement to the command device which then responds to the server with the distance measurement or other corresponding value. The server then calculates door status which is saved in memory for immediate and/or later use. Thus, another important aspect of the invention is that an Internet enabled mobile device can simulate a mechanical button press and determine open/close status by communicating though a server which provides control commands to a command device. The command device acts as the garage door opener with direct communication with the garage door controller. The user opening the garage door or other barrier has no direct communication with the door controller.

Figure 3:
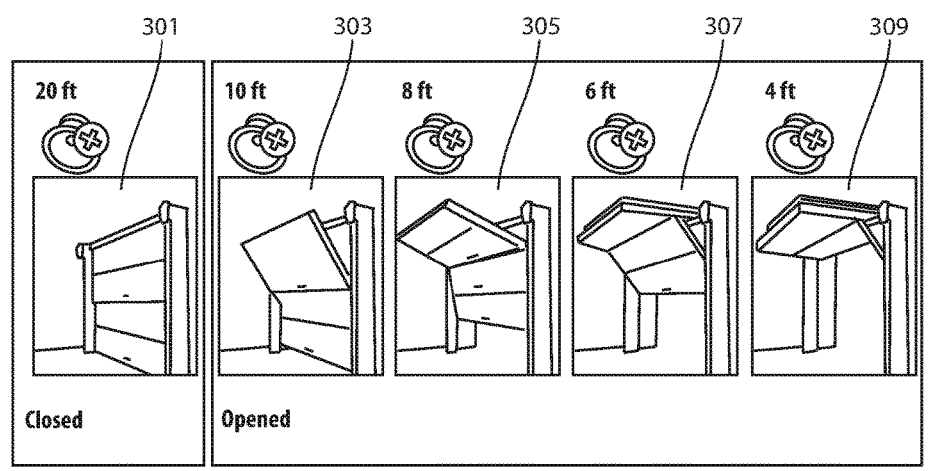
FIG. 3 is a diagram illustrating how a Sonar device reads the distance between it and either the garage floor or the garage door.

FIG. 3 is series of illustrative diagrams showing how the Sonar unit operates to determine position of the garage door in relation to the ground. The Sonar unit attaches to the command device that is installed directly above the garage door whose sound emitting and sensing are pointed towards the garage floor. The Sonar unit must be positioned in such a way that when the door is closed, the Sonar unit can read a clean and unobstructed distance from the garage floor surface. When the door is opened it should fully cover the Sonar unit so that the Sonar reads the distance from it to the garage door its self. In position 301, the garage door is fully closed and the Sonar reading would be approximately 20 feet in position 303 the garage door is partially raised and the Sonar reading would be approximately 10 feet. In position 305 the garage door is further raised and the Sonar indicates a positon of approximately 8 feet. In position 307, the garage door is even further raised and the Sonar indicates a position of approximately 6 feet. Finally, in position 309, the garage door is in a fully raised position and the Sonar indicates the distance of approximately 4 feet. Thus, based on the data provided by the Sonar measurement, the status of the garage door can be determined to be either fully closed or opened if the Sonar measurement is in the range between 4 feet to 10 feet. This distance is relayed to the Cloud based server(s) for this determination. Any and all determination of status is made solely by the Cloud based server. In no way does the command device residing in the home or other location have any information about the status of the barrier or door.

Figure 4:
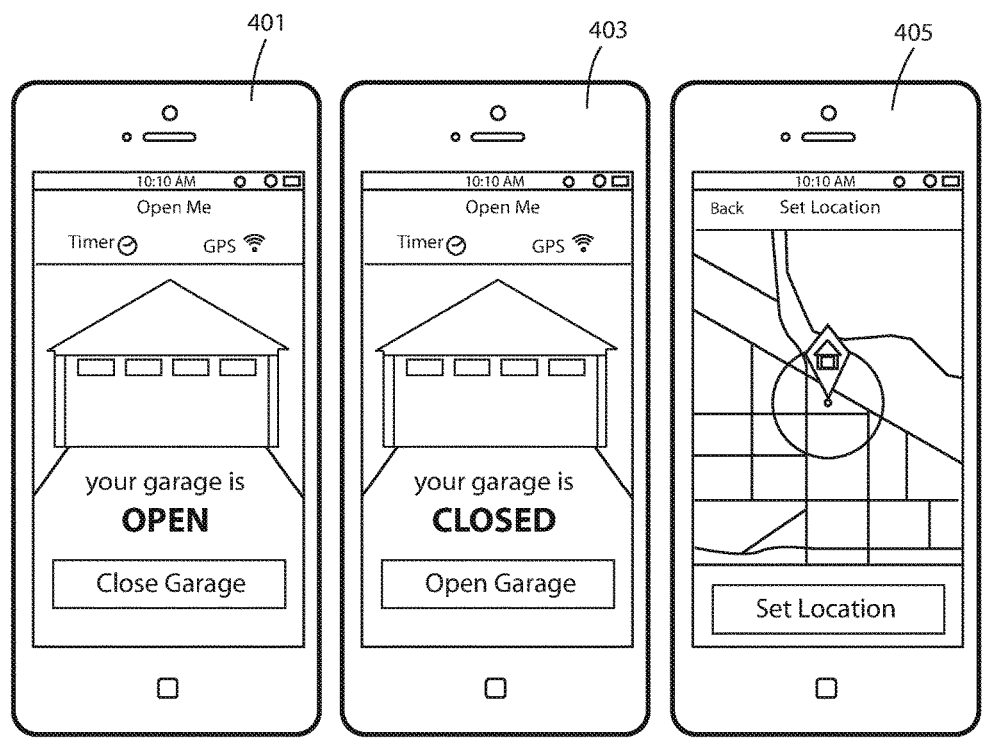
FIG. 4 illustrates screen shots of the Internet enabled user device showing various garage door positions as well as a screen shot used for setting a location of the garage door so that it may be opened and/or closed at some predetermined radius from the garage door utilizing the GPS location of the user's device.

FIG. 4 illustrates various screen displays of the Internet enabled user device showing various garage door position status. More specifically, screen display 401 illustrates an image with an open garage door with a button at the lower portion of the screen to close the door. Conversely, screen display 403 illustrates a screenshot with the garage door in a closed position with a button at the lower portion of the screen to open the garage door. Finally, screen display 405 is a screenshot illustrating a map where the user can set the location of the garage door with a predetermined radius surrounding the location where the garage door might be automatically opened and/or closed. In one embodiment, the garage door will be automatically closed after a predetermined amount of time if the server determines the garage door is open based on a measured report(s) compared to user defined thresholds as measured by the command device. Thus, a further aspect of the invention allows the user with an accompanying mobile app and web interface to open and close their door from anywhere in the world while providing some predetermined separation. Furthermore, the user can request status of the door (as computed by the server from the reported Sonar readings of the server based opening device. Users can also set a Global Positioning System (GPS) position on their smart phone which allows the mobile app to request the servers to open/close the user's door when they have entered or departed a predetermined radius form the garage door. It is important to recognize that the GPS position does not directly control the state of the garage door, but rather reports to the cloud services when it is within or exterior to a user defined range. This cloud service then determines if the door should be operated.

Figure 5:
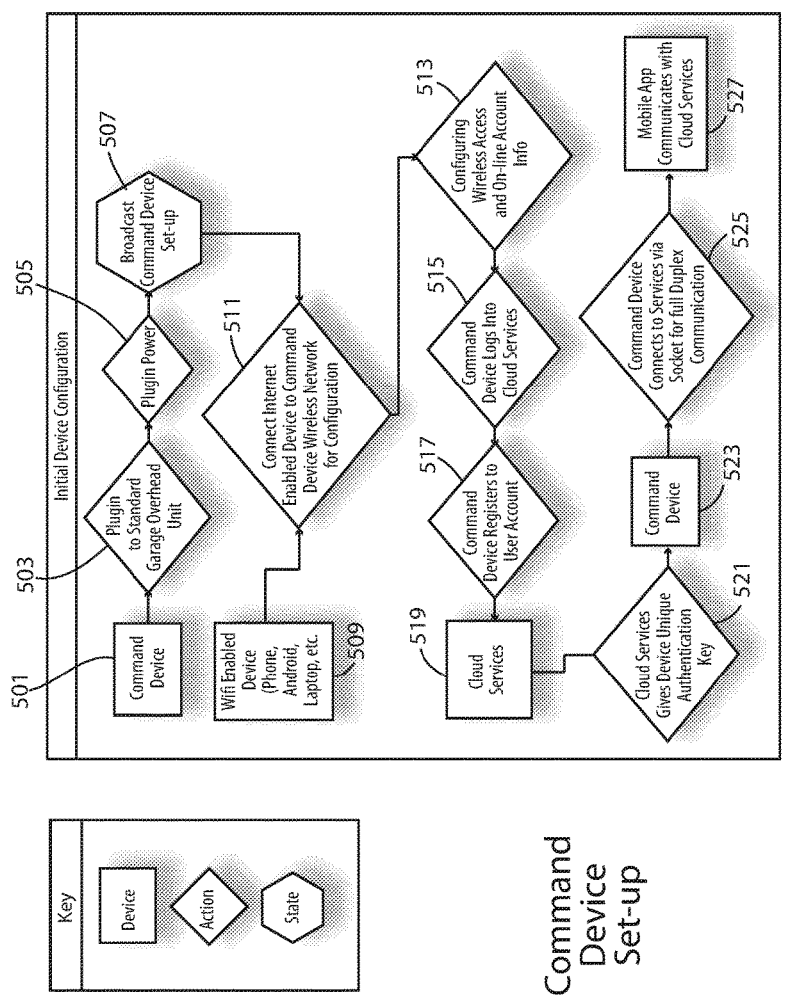
FIG. 5 is a flow chart diagram illustrating the processes of the command device at start-up.

FIG. 5 is a flow chart diagram illustrating the processes of various embodiments of the server based garage door opener at start-up. The start up process 500 begins where the command device 501 is plugged into the garage overhead unit 503. Power is applied 505 and a wireless network is broadcasted 507 by the command device which enables wireless enabled devices 509 to connect to the command device for easy configuration 511. This configuration includes setting up an IP address and entering account information 513 for the Cloud based services 519. The command device logs into Cloud services 515 and the device registers to a Cloud based user account 517. Thereafter, the Cloud Services 519 gives the command device 523 a unique authentication key 521. With this authentication key, the command device 523 connects to Cloud services via web sockets (and can fallback to long-polling if needed) for full-duplex communication 525 enabling mobile apps 527 to communicate with the command device 523 through the Cloud services.

Figure 6:
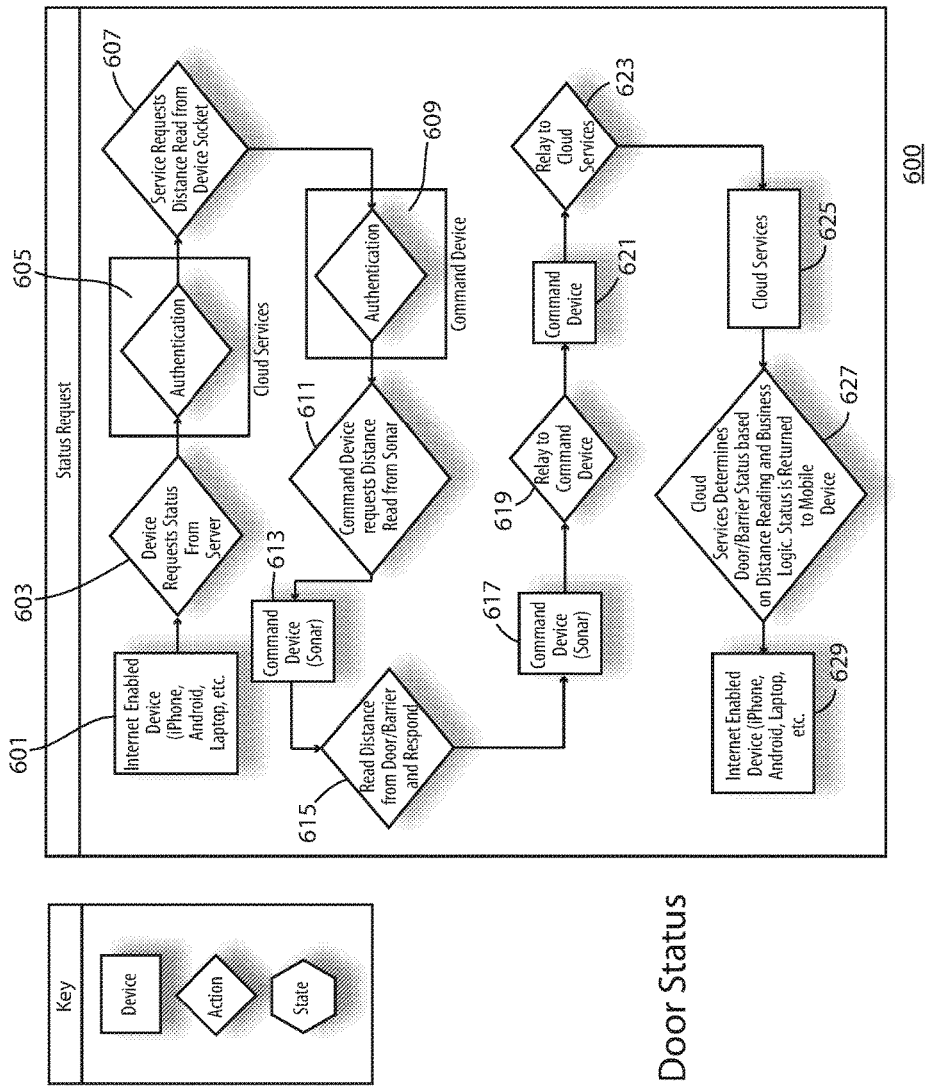
FIG. 6 is a flow chart diagram illustrating operational status of the door.

FIG. 6 is a flow chart diagram illustrating operational status of the door. The door status process 600 begins where the Internet enabled device such as an iPhone, android or laptop 601 requests status from a Cloud based server 603. After an authentication process 605, the Cloud based server makes a request to determine distance over the socket connection 607 to the command device 609 which in turn authenticates the request before requesting a distance reading 611 from the Sonar device 613. The Sonar device determines a distance measurement 615 from the garage floor where it is then communicated 619 to the command device 621. Once at the command device, this information is communicated to Cloud services 623 where the Cloud services 625 work to determine the door status based on the distance reading 627. Thereafter, this information is conveyed to the Internet enabled mobile device 629 where it can be displayed to the user.

Figure 7:
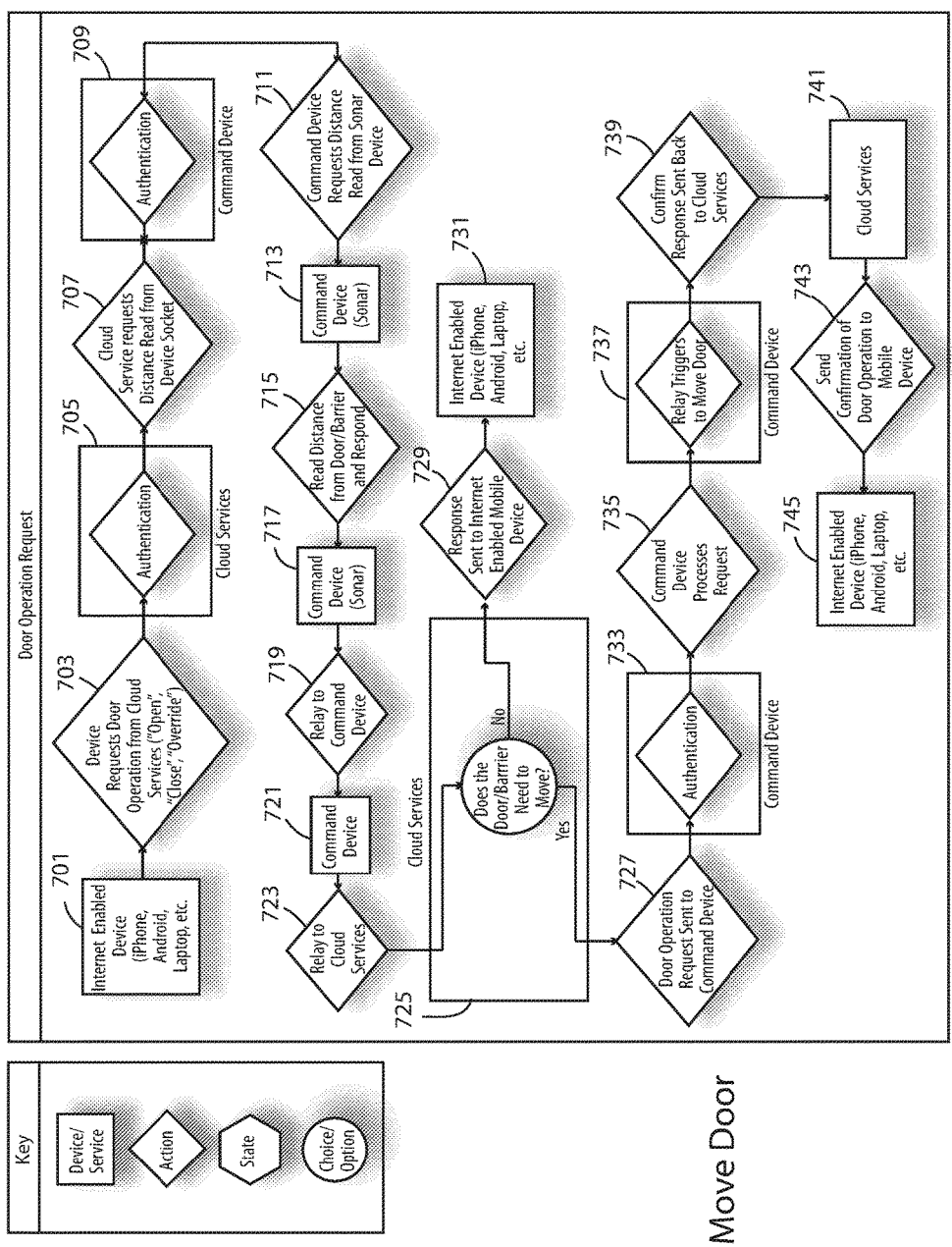
FIG. 7 is a flow chart diagram illustrating operational movement of the door.

FIG. 7 is a flow chart diagram illustrating operational movement of the barrier or door. The process of moving the door 700 to an "opened" or "closed" position includes the steps of using the Internet enabled device 701to request door movement from Cloud services 703. This would include moving the door either into an opened or closed position. After the mobile application is authenticated 705, a service request is sent 707 to the command device 709 from the Cloud services 705. This request is authenticated 709 by the commanding device 709 and the commanding device requests a distance "read" or measurement from the accompanying Sonar device 711. The Sonar device 713 works to provide a distance read from the device to the garage door or to the garage floor using echolocation. The Sonar device 717 then communicates this information to the command device 721 where the command device 723 communicates this data to Cloud services 725.

While in Cloud services 725, a determination is made if the door needs to move. This information is determined based on the distance reading from the Sonar device and logic stored in Cloud services. This determination can be made using a data comparison between the measured and stored distance data. If the garage door does not need to move, a response is sent to the Internet enabled device 729 where it can be displayed to the User on the device 731. If the garage door or barrier does need to be moved, a door operation request is sent to the controlling device 733. After the command device authenticates the request 733, the operational request is processed 735. This communication triggers and/or activates the door to move 737 and a confirmation response is sent back to Cloud services 739. While at Cloud services 741, a confirmation response is sent back to the Internet enabled device 743 where the door movement and end result can be displayed to the user using text, sound queues and/or visual icons 745.

Thus, embodiments of the present invention are directed to a garage door and/or movable barrier opening system that includes at least one server for receiving commands in a first mode from a portable communications device and converting the commands to a second mode for sending to a commanding device. Likewise, at least one server may be used for receiving commands in a second mode from a commanding device and converting the commands to a first mode for sending to a portable communication device. A load balancer may be used for receiving commands from either the first or second mode and relaying them to at least one Cloud server. A WiFi transceiver works for receiving the commands in the second mode from the Cloud and wirelessly communicating the commands in the second mode to a command device attached to or embedded within a garage door opener unit. A distance measuring sensor is connected to the commanding device for measuring the open distance of a garage door to the garage floor; and where the distance is communicated back to the server for determining whether the status of the garage door or movable barrier should be changed based on user location or commands from a portable web enabled device.

In still other embodiments, a moveable barrier control system includes an Internet enabled mobile device that works with a movable barrier operator. A command device works with the barrier operator for controlling movement of a movable barrier based on commands received from the Internet enabled mobile device in communication with at least one server. A network interface electronically is connected to the command device for enabling the command device to communicate with a Cloud based network. The Cloud based network responds to requests received by the Internet enabled mobile device in a first mode by sending a status of the movable barrier over the Cloud based network from at least one server over the Cloud based network. The command device responds to the status change request by moving the barrier. Thus, status of the garage door is determined solely in the Cloud and the user never communicates directly with the barrier operator but instead movement and status is controlled by at least one server in the Cloud.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A garage door opening system comprising:
   a first server connected to the Internet for receiving commands in a first mode from a portable communications device and converting the commands to a second mode;
   a second server for receiving commands from the first server where a garage door command device is located at a separate location, and on a separate network than the first and second server, such that the garage door command device includes a WiFi transceiver collocated with a garage door for receiving the commands in the second mode from the second server; and
   wherein the portable communications device provides open or close commands to the first server for relaying through the second server to the garage door command device based upon the portable communications device crossing a physical threshold as detected through the portable communications device's global position system (GPS) such that the first server or the second server determines if movement of the garage door needs to take place and relays any needed actions to the command device for operation of the garage door in the second mode and further wherein the second server will automatically close the garage door after a predetermined amount of time if the second server determines the garage door is open based upon user defined thresholds as measured by the command device.

2. A garage door opening system as in claim 1, wherein the status of the garage door is open, closed, or unknown; as calculated by the server and based on a measured report from the garage door command device compared with user defined thresholds.

3. A garage door system as in claim 1, wherein the portable communications device is a smart phone, tablet, laptop, PC or any other Internet enabled device.

4. A garage door system as in claim 1, wherein the portable communications device provides the status of the garage door to the user.

5. A garage door system as in claim 1, wherein the portable communications device allows the user to activate the movable barrier.

6. A garage door opening system comprising:
   a first server connected to the Internet for receiving commands in a first mode from a portable communications device and converting the commands to a second mode;
   a second server for receiving commands from the first server where a garage door command device is located at a separate location, and on a separate network than the first and second server, such that the garage door command device includes a WiFi transceiver collocated with a garage door for receiving the commands in the second mode from the second server;
   a distance measuring sensor using SONAR connected to the garage door command device for measuring the distance between the sensor and the garage door or the sensor and the garage floor; and wherein the measured distance is communicated back to the at least one server; and
   wherein the second server will automatically close the garage door after a predetermined amount of time if the second server determines the garage door is open based upon user defined distance thresholds as measured by the sonar device.

7. A garage door opening system as in claim 6, wherein the status of the garage door is open, closed, or unknown; as calculated by the server and based on a measured distance report from the garage door command device compared with user defined thresholds.

8. A garage door system as in claim 6, wherein the portable communications device is a smart phone, tablet, laptop, PC or any other Internet enabled device.

9. A garage door system as in claim 6, wherein the portable communications device provides the status of the garage door to the user.

10. A garage door system as in claim 6, wherein the portable communications device allows the user to activate the movable barrier.

11. A garage door opening system comprising:
    a first server connected to the Internet for receiving commands in a first mode from a portable communications device and converting the commands to a second mode after the user is authenticated;
    a second server for receiving commands from the first server where a garage door command device is located at a separate location, and on a separate network than the first and second server, such that the garage door command device includes a WiFi transceiver collocated with a garage door for receiving the commands in the second mode from the second server; and
    wherein the second server will automatically close the garage door after a predetermined amount of time if the second server determines the garage door is open based upon user defined thresholds as measured by the command device.

12. A garage door opening system as in claim 11, wherein the status of the garage door is open, closed, or unknown; as calculated by the server and based on a measured report from the garage door command device compared with user defined thresholds.

13. A garage door system as in claim 11, wherein the portable communications device is a smart phone, tablet, laptop, PC or any other Internet enabled device.

14. A garage door system as in claim 11, wherein the portable communications device provides the status of the garage door to the user.

15. A garage door system as in claim 11, wherein the portable communications device allows the user to activate the movable barrier.

* * * * *